(12) United States Patent
Rio et al.

(10) Patent No.: US 6,915,043 B2
(45) Date of Patent: Jul. 5, 2005

(54) METHOD OF RE-CLADDING AN OPTICAL FIBER AND PRODUCT THUS OBTAINED

(75) Inventors: Stéphane Rio, Ploumanac'h (FR); Guillaume Peigne, Roche-Blanche (FR)

(73) Assignee: Highwave Optical Technologies (FR)

( * ) Notice: Subject to any disclaimer, the term of this patent is extended or adjusted under 35 U.S.C. 154(b) by 0 days.

(21) Appl. No.: 10/343,677

(22) PCT Filed: Aug. 3, 2001

(86) PCT No.: PCT/FR01/02540

§ 371 (c)(1),
(2), (4) Date: Feb. 3, 2003

(87) PCT Pub. No.: WO02/12934

PCT Pub. Date: Feb. 14, 2002

(65) Prior Publication Data

US 2003/0169990 A1 Sep. 11, 2003

(30) Foreign Application Priority Data

Aug. 3, 2000 (FR) .............................. 00 10257

(51) Int. Cl.⁷ ................................................ G02B 6/34
(52) U.S. Cl. ..................... 385/37; 385/123; 385/127; 385/128; 385/141
(58) Field of Search .............................. 385/37, 99, 96, 385/97, 123, 127, 128, 141

(56) References Cited

U.S. PATENT DOCUMENTS

| | | | | |
|---|---|---|---|---|
| 4,360,248 A | * | 11/1982 | Bickel et al. | 385/46 |
| 4,802,723 A | * | 2/1989 | Miller | 385/32 |
| 5,367,589 A | | 11/1994 | MacDonald et al. | 385/37 X |
| 6,222,973 B1 | * | 4/2001 | Starodubov | 385/128 |
| 6,275,628 B1 | * | 8/2001 | Jones et al. | 385/29 |
| 6,310,998 B1 | * | 10/2001 | Starodubov | 385/37 |
| 6,408,118 B1 | * | 6/2002 | Ahuja et al. | 385/37 |
| 6,436,198 B1 | * | 8/2002 | Swain et al. | 134/19 |
| 6,528,239 B1 | * | 3/2003 | Starodubov | 430/321 |
| 6,549,712 B2 | * | 4/2003 | Abe et al. | 385/123 |
| 2003/0138232 A1 | * | 7/2003 | Abe et al. | 385/128 |
| 2003/0169990 A1 | * | 9/2003 | Rio et al. | 385/128 |

FOREIGN PATENT DOCUMENTS

| | | | | |
|---|---|---|---|---|
| GB | 2 148 537 A1 | 5/1985 | | 385/99 X |
| GB | 2 236 866 A1 | 4/1991 | | 385/99 X |
| JP | 2-61602 A1 | 3/1990 | | 385/99 X |

OTHER PUBLICATIONS

Iwashima, et al., Temperature compensations technique for fibre Bragg gratings using liquid crystalline polymer tubes:, Electronics Letters, vol. 33, No. 5, Feb. 27, 1997.

* cited by examiner

Primary Examiner—Brian M. Healy
(74) Attorney, Agent, or Firm—Lerner, David, Littenberg, Krumholz & Mentlik, LLP

(57) ABSTRACT

The invention concerns a method for re-cladding an optical fiber (10) at least partly stripped over part of its length (16). The invention is characterised in that it comprises steps which consist in: placing a flexible tube (20) on the zone (16) of stripped fiber, injecting a polymer material (40) into the tube (20), through an axial end thereof, and polymerising the injected material (40) so that it adheres to the outer surface of the zone (16) of stripped fiber and to the inner surface of the tube (20), over the entire length of the tube (20). The invention also concerns the resulting optical fibers.

23 Claims, 2 Drawing Sheets

Figure 1:
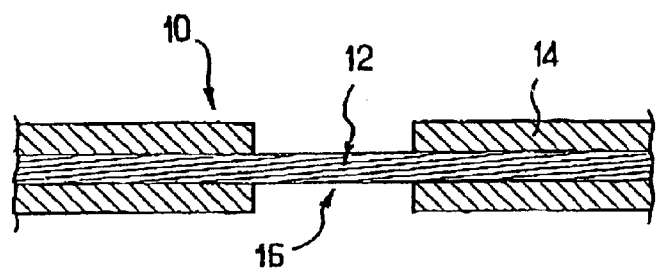

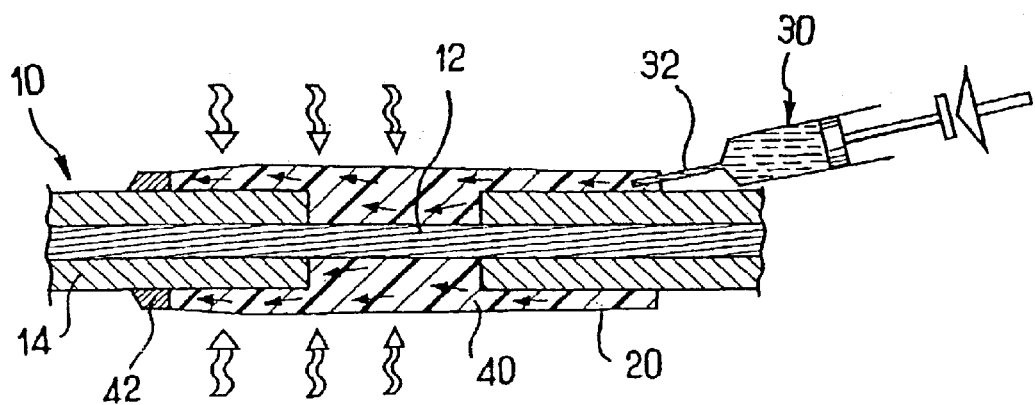
FIG_5
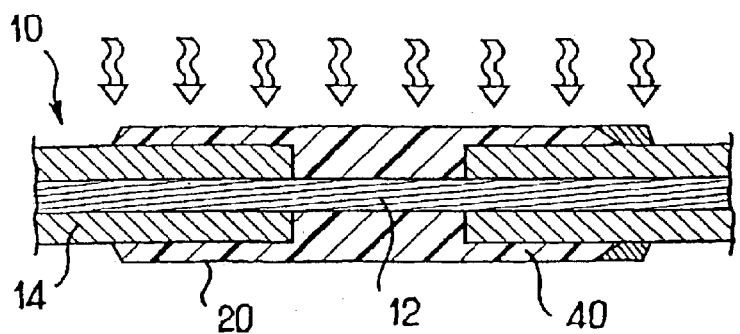
FIG_6
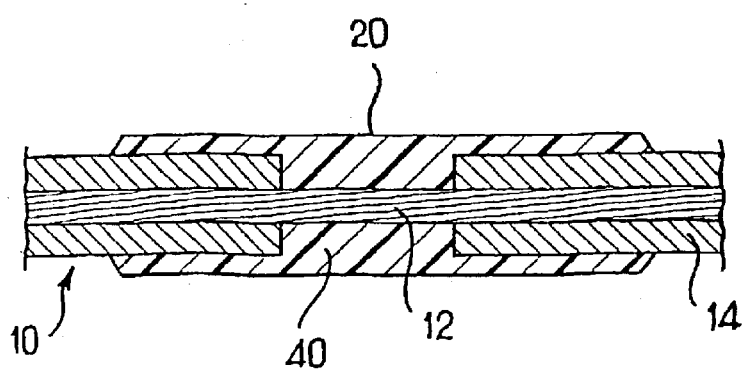
FIG_7

METHOD OF RE-CLADDING AN OPTICAL FIBER AND PRODUCT THUS OBTAINED

The present invention relates to the field of optical fibers.

More specifically, the present invention is applicable to optical fibers which are at least partially stripped over part of their length, for example in order to form a component in the core of the fiber. In this context, the object of the present invention is to reconstruct the cladding of the fiber.

The present invention is in particular applicable to optical fibers, whatever their type (250 μm to 400 μm), integrating a Bragg grating. On this subject, reference can usefully be made to documents [1] and [2].

However, the present invention is not limited to this particular application. It may also be implemented in any application requiring a local reinforcement of the fiber.

Nowadays, virtually all optical fibers consist of a central core and an outer cladding.

The cladding of an optical fiber provides mechanical protection. Most often, this protection consists of an acrylate polymer. Its destruction or its removal, even when local, justified for example by producing a component such as a Bragg grating, seriously weakens the optical fiber.

The only high-performance technique at present for manufacturing a recladding is molding [3]. The region to be reclad is placed in a mold. Next, a polymer identical to that used for the initial cladding of the fiber is injected into the mold, around the fiber, and polymerized.

However, this technique is not always satisfactory.

In many cases, the optical fiber comprises a component, such as a Bragg grating, at the stripped region, which means that the recladding should not mechanically stress this region so as not to disturb the optical parameters of the grating. Furthermore, this involves a value of the refractive index of the polymer matched to the optical function photoinscribed in the fiber.

The inventors have noted experimentally that, by molding, it is very difficult to manufacture a recladding of a quality equivalent to the initial cladding of the fiber. Several major defects are recurrently present. Among the main defects, mention may be made of:

flash due to the molds (junction region of the molds), tearing and delamination of a thin surface layer of the recladding during demolding, internal delamination of the recladding during demolding (i.e. detachment of the recladding from the optical fiber), a lack of material, and the presence of bubbles in the recladding.

The aim of the present invention is to reconstruct a uniform protection over a previously stripped fiber and to eliminate defects due to manufacture by molding.

Even more specifically, the aim of the present invention is to reconstruct the cladding of a locally stripped fiber by producing a recladding of a quality equivalent to that of the initial cladding of the fiber and thereby retaining the initial flexibility of the latter together with a minimum amount of volume.

In particular, it is important that the finished product retains a flexibility close to that of the initial fiber. In this way, the recladded part can be curved or wound over short radii like a standard optical fiber (the minimum radius of curvature specified for an optical fiber is typically 15 mm).

The optical fibers obtained by implementing the method according to the present invention may especially be used in the field of telecommunications. This means that they retain their properties throughout their lifetime and in uninspected conditions of use (that is typically 20 years, from −40° C. to +85° C.). This information can be verified by passing the aging tests defined by the Telcordia (ex-Bellcore) GR-1209-CORE and GR-1221-CORE standards.

The aforementioned aims are achieved within the scope of the present invention by virtue of a method comprising the steps which consist in:

placing a flexible tube over a region of stripped fiber comprising a Bragg grating, injecting a polymer material into the tube, through one axial end thereof, and polymerizing the injected polymer material such that the latter adheres, on the one hand, to the outer surface of the region of stripped fiber and, on the other hand, to the inner surface of the tube, over the entire length of the tube.

Thus, within the scope of the present invention, the tube remains attached to the fiber, at the end of the recladding method.

The present invention also relates to the optical fibers thus recladded.

Figure 2:
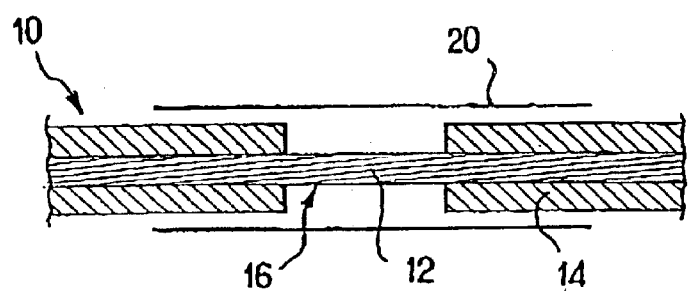
Figure 3:
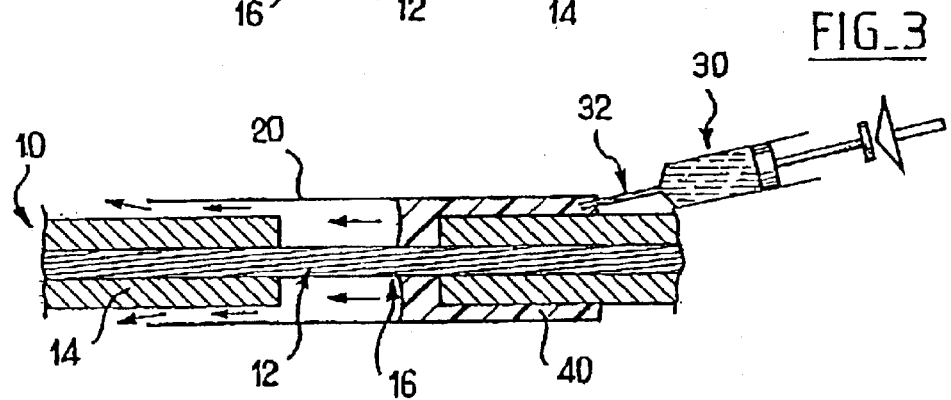
Figure 4:
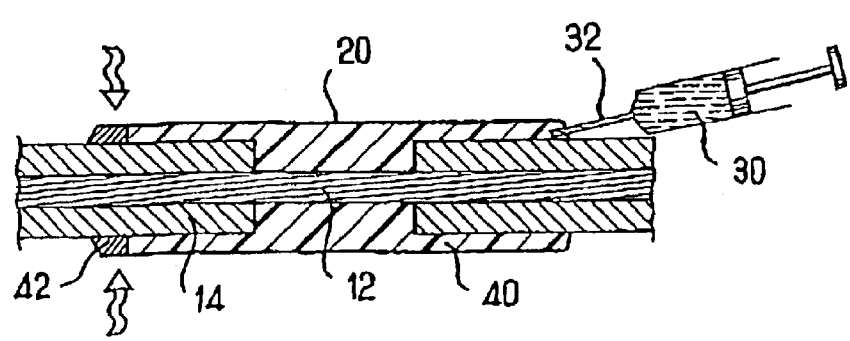

Other characteristics, aims and advantages of the present invention will become apparent on reading the following detailed description, with reference to the appended drawings, given by way of nonlimiting example and in which:

FIG. 1 shows a schematic view in cross section of a partially stripped optical fiber, FIG. 2 shows the step according to the present invention consisting in placing, a tube over the stripped region of the optical fiber, FIG. 3 shows the step consisting in injecting a polymer material into the tube thus placed, FIG. 4 shows diagrammatically a step consisting in polymerizing the end of the injected material away from the injection region, FIG. 5 shows diagrammatically a step consisting in pressurizing the material thus injected, FIG. 6 shows diagrammatically a step consisting in polymerizing all the injected material, and FIG. 7 shows diagrammatically an optical fiber thus obtained within the scope of the present invention.

In the appended figures, an optical fiber 10 comprising a core 12 coated with a first cladding made of silica and possibly surrounded by an outer mechanical protective cladding 14 is shown diagrammatically.

As illustrated in FIG. 1, for some applications, it is the latter cladding 14 which is partly removed at 16 over part of the length of the optical fiber, for example for producing components such as a Bragg grating, and it is specifically over this stripped region 16 that the present invention proposes to reconstruct a cladding with optimum mechanical protection.

Within the scope of the present invention, before anything else, it is essential that the stripped fiber 10 is cleaned with alcohol over its entire length before starting the assembly. This is because, the quality of the bonding between the fiber and the recladding together with the purity of the final recladding depend heavily on the surface condition of the fiber.

After this cleaning with alcohol, a flexible tube 20 is placed over the region 16 of stripped fiber, as can be seen in FIG. 2.

Once the tube 20 is put in place, a polymer material 40 is injected into the tube 20 through one axial end thereof. This step is shown diagrammatically in FIG. 3.

From the start of injection of the material 40 until the end of the method, the fiber 10 must be kept straight, and the tube 20 must be centered on the stripped region 16, that is to say with virtually identical access on each side of this stripped region 16. However, at the start of injection, the tube 20 may not be perfectly coaxial with the fiber 10. It may even be temporarily brought into contact with the fiber 10, by means of an axial generatrix, in order to thus provide a large space between the fiber 10 and the tube 20, in order to facilitate injection of the polymer material 40. Of course, subsequently, the tube 20 may be rendered coaxial with the fiber 10.

Preferably, in order to carry out the injection of the material 40, a syringe 30 is used, having a needle 32 of suitable size and quality so that the cladding of the fiber is not damaged and to ensure rapid filling of the tube 20.

As can be seen in FIG. 3, once the material 40 is injected via a first end of the tube 20, the air initially present in the tube 20 is ejected by the second end thereof.

In order not to trap air during injection of the polymer 40, the cladding 14 of the fiber, on either side of the stripped region 16, must remain bonded to the fiber 12 after stripping. The angle made by the front of polymer 40 with the stripped fiber 12 is not critical.

The polymerization of the material 40 may be carried out in several ways (hot, cold, UV, etc.). Within the scope of the present invention, polymerization under UV is very preferably chosen. This is because the latter is well suited to carrying out local polymerization. Furthermore, this type of treatment ages the tube 20 less than a thermal polymerization.

As has been shown diagrammatically in FIG. 4, once the tube 20 is filled with polymer material 40, a plug 42 is created by local polymerization on the axial end of the tube 20 away from the injection end, so as to halt the progress of the injected polymer 40 and to facilitate the pressurization thereof.

In order to prevent debonding between the tube 20 or the fiber 10 and the polymer 40, under the effect of shrinkage of the polymer 40 by polymerization under ultraviolet radiation, as has been shown diagrammatically in FIG. 5, the polymer 40 is placed under pressure, by forced injection, during the polymerization.

As shown in this FIG. 5, once the polymer 40 is put under pressure by forced injection, a step-by-step polymerization (from the plug 42 to the syringe 30) is carried out until reaching a few millimeters from the needle 32.

The syringe 30 is withdrawn while still injecting the polymer 40 so as not to create bubbles in the polymer. Next, the entire assembly is placed under ultraviolet radiation, as shown diagrammatically in FIG. 6, so as to provide a complete polymerization of the material 40 over the entire length.

Experiments carried out by the inventors have given excellent results. The experiments have shown excellent bonding, over the entire length, between the fiber 10, the cladding obtained by the material 40 and the tube 20. They have made it possible to remove all the defects previously noted with molding and demolding. Moreover, they have shown good mechanical strength and a recladding capable of perfectly withstanding extreme climatic conditions (especially from −40° to +85° C.).

Moreover, the method proposed within the scope of the present invention allows industrial mass-production.

The polymer 40 is preferably formed from an acrylate polymer, such as, for example, the material marketed under the name DSM-950-106 (Desolyte).

Preferably, the polymer material 40 complies with the parameters below:
  refractive index: 1.46 to 1.52 (depending on the optical applications),
  viscosity: 5000 to 7000 mPa.s (at 25° C.),
  adhesion on glass: 50 to 70 ($10^{-3}$) N,
  shrinkage, during the polymerization, of less than 5%,
  Young's modulus less than or equal to 1000 MPa.

The tube 20 must have good flexibility capable of allowing winding or curving of the recladded fiber over a small radius. It may be, for example, a tube based on a silicone material or a material chosen from the family of thermoplastic polyester elastomers.

Typically, the tube 20 has a length at least 2 cm greater than the length of the stripped region 16.

Thus, the tube 20 exceeds, preferably by at least 1 cm, each end of the stripped region 16.

Typically, for a stripped region of less than or equal to 2 cm, the tube 20 has a length of about 4 cm.

The inner diameter of the tube 20 must be such that the minimum free space between the fiber 10 and the tube 20 allows acceptable progress of the polymer 40 during the injection. The spacing between the fiber 10 and the inside of the tube 20 is associated with the viscosity of the polymer 40 used. For fibers 10 of a diameter less than 250 $\mu$m, the inner diameter of the tube 20 is typically about 0.5 mm, while for fibers of a diameter between 250 $\mu$m and 400 $\mu$m, the inner diameter of the tube 20 is typically about 0.650 mm.

The spacing between the fiber 10 and the inside of the tube 20 is typically about 125 $\mu$m. According to a preferred embodiment, the outer diameter of the tube 20 is about 900 $\mu$m. Finally, preferably, the tube 20 is translucent. This makes it possible to check the progress of the polymer material 40 in the tube 20. The tube 20 must also be transparent to UV in order to allow the polymerization.

The inner diameter of the injection needle 32 is preferably greater than 250 $\mu$m. This diameter is associated with the viscosity of the polymer 40. The outer diameter of the needle 32 is preferably less than or equal to 450 $\mu$m. This diameter is associated with the free spacing in the tube 20 and with the elasticity thereof.

According to a preferred, but nonlimiting, embodiment of the present invention, the tube 20 is formed from a D46 flexible tube marketed under the name Hytrel (Hytrel is a registered trademark of DuPont de Nemours), with a length of 4 cm, while the needle is a 26 Gx½ needle with an outer diameter of 450 $\mu$m and an inner diameter greater than 250 $\mu$m. A tube of this type is part of the family of thermoplastic polyester elastomers. This is a copolyester based on polyether segments and on polyester segments.

Of course, the present invention is not limited to the particular embodiment which has just been described, but extends to any variant complying with its spirit.

[1] D. Varelas, "Mechanical reliability of optical fiber Bragg gratings", Doctoral Thesis, University of Lausanne (Switzerland), 1998.

[2] S. Boj, "Réalisation de filtres sélectifs en fréquence intégrés dans les fibers optiques et applications" [Production of frequency-selective filters integrated within optical fibers and applications], Doctoral Thesis, University of Lille, 1995.

[3] "Documentation technique des machines de regainage" [Technical documentation on recladding machines], Vytran Corporation, 1999.

What is claimed is:

1. A method of recladding an optical fiber which is at least partially stripped over part of its length comprising the steps of:

placing a flexible tube over a region of stripped fiber comprising a Bragg grating, injecting a polymer material into the tube, through one axial end thereof, and polymerizing the injected material such that the injected material adhere, to the outer surface of the region of stripped fiber and to the inner surface of the tube over the entire length of the tube.

2. The method as claimed in claim 1, wherein the injected material is an acrylate polymer.

3. The method as claimed in claim 1 wherein the material is polymerized under ultraviolet radiation.

4. The method as claimed in claim 1, wherein the material is injected by means of a syringe.

5. The method as claimed in claim 1, wherein the stripped fiber is cleaned with alcohol.

6. The method as claimed in claim 1, wherein the fiber is held straight and the tube is centered on the stripped region during the entire process of injecting the material.

7. The method as claimed in claim 1, wherein once the tube is filled with polymer material, local polymerization of the injected material is carried out over the axial end thereof opposite the injection region, in order to create a plug capable of halting the progress of the injected polymer.

8. The method as claimed in claim 1, wherein the polymer material is placed under pressure during the polymerization.

9. The method as claimed in claim 1, wherein a step-by-step polymerization of the polymer is carried out, the polymer being placed under pressure by forced injection, from a plug prepolymerized away from the injection region toward the injected region, then the complete polymerization of all the injected material is carried out.

10. The method as claimed in claim 1, wherein the injected polymer material has a refractive index between 1.46 and 1.52.

11. The method as claimed in claim 1, wherein the injected polymer material has a viscosity between 5000 and 7000 mPa.s at 25° C.

12. The method as claimed in claim 1, wherein the injected polymer material has a coefficient of adhesion on glass between 50 and $70 \times 10^{-3}$ N.

13. The method as claimed in claim 1, wherein the injected polymer material has a shrinkage of less than 5% during the polymerization.

14. The method as claimed in claim 1, wherein the injected polymer material has a Young's modulus less than or equal to 1000 MPa.

15. The method as claimed in claim 1, wherein the tube is a tube made of a material chosen from the group comprising: silicone and thermoplastic polyester elastomers.

16. The method as claimed in claim 1, wherein the tube has a length at least 2 cm greater than the length of the stripped region.

17. The method as claimed in claim 1, wherein the space between the fiber and the inside of the tube is about 125 $\mu$m.

18. The method as claimed in claim 1, wherein the tube is translucent.

19. The method as claimed in claim 1, wherein the tube is transparent to UV.

20. The method as claimed in claim 1, wherein the inner diameter of the tube is about 0.5 mm for fibers with a diameter less than 250 $\mu$m and about 0.65 mm for fibers with a diameter between 250 $\mu$m and 400 $\mu$m.

21. The method as claimed in claim 4, wherein the syringe has an inner diameter greater than 250 $\mu$m.

22. An optical fiber having recladding over a previously stripped region, obtained by placing a flexible tube over a region of stripped fiber comprising a Bragg grating, injecting a polymer material into the tube, and polymerizing the injected polymer material such that the injected polymer material adheres to the outer surface of the region of stripped fiber and to the inner surface of the tube, over the entire length thereof.

23. The method as claimed in claim 1, wherein the tube has a total length of approximately 4 cm.

* * * * *